United States Patent [19]

Bieri

[11] Patent Number: 4,782,857

[45] Date of Patent: Nov. 8, 1988

[54] METHOD AND APPARATUS FOR UNIFORMLY DISTRIBUTING SOLIDS-CONTAINING LIQUID

[75] Inventor: Robert Bieri, Zurich, Switzerland

[73] Assignee: Sulzer Brothers Limited, Winterthur, Switzerland

[21] Appl. No.: 5,760

[22] Filed: Jan. 21, 1987

[30] Foreign Application Priority Data

Feb. 7, 1986 [CH] Switzerland .................... 00505/86

[51] Int. Cl.⁴ ............................................. F16K 51/00
[52] U.S. Cl. ............................. 137/561 A; 137/561 R
[58] Field of Search ...................... 137/561 R, 561 A

[56]  References Cited

U.S. PATENT DOCUMENTS

| | | | |
|---|---|---|---|
| 825,317 | 7/1906 | Haskell | 137/561 R |
| 3,037,629 | 6/1962 | Fontein et al. | 137/561 R X |
| 3,272,231 | 9/1966 | Livingston | 137/561 R |
| 3,420,443 | 1/1969 | Van Koppen et al. | 137/561 R X |
| 3,496,261 | 3/1964 | Parr | 137/561 R |
| 3,650,292 | 3/1972 | Platz et al. | 137/561 A |
| 3,736,955 | 6/1973 | Schlesser | 137/561 A |
| 3,794,056 | 2/1974 | Warren | 137/561 A |
| 4,256,140 | 3/1981 | Swaroop et al. | 137/561 A |
| 4,494,567 | 1/1985 | Troyen | 137/561 A |
| 4,609,009 | 9/1986 | Tisone | 137/561 A |

FOREIGN PATENT DOCUMENTS 18745 10/1895 United Kingdom .......... 137/561 A

Primary Examiner—John Rivell
Attorney, Agent, or Firm—Kenyon & Kenyon

[57]  ABSTRACT

The liquid distributor employs a distribution channel having a flow cross-section which is reduced in steps by parallel walls with slot-like exit orifices between consecutively adjacent walls. The exit orifices are arranged so that parallel component flows may be expelled from the channel while the velocity of the remaining flow remains constant. Deflectors may also be provided downstream of the exit orifices to deflect the component flows downwardly.

18 Claims, 2 Drawing Sheets

METHOD AND APPARATUS FOR UNIFORMLY DISTRIBUTING SOLIDS-CONTAINING LIQUID

This invention relates to a method and apparatus for uniformly distributing a solids-containing liquid. More particularly, this invention relates to a method and apparatus for distributing a solids-containing liquid uniformly over a cross-sectional area.

Heretofore, various types of liquid distributors have been known for distributing a continuously supplied mass flow to a cross sectional area in a large number of mass flows which are usually on the same side. Liquid distributors of this type have a variety of uses. One particular use of these liquid distributors is in exchange, transfer and reaction columns in which a number of flows, for example, a gas flow and a liquid flow, are brought into contact with one another in cocurrent or countercurrent. In such a case, one important consideration is that the liquid distributor should be capable of use over a wide range of loadings and, particularly, in the case of countercurrent columns having a gas phase, that a large free cross section for the through flowing gas is ensured.

In columns of the above type and, in general, in chemical engineering, use has been made of liquid distributors in which the liquid is distributed over trays of weirs or through orifices below the level of the liquid. In these cases, the exit speed of the liquid conforms with Torricelli's law wherein $V = \sqrt{2 gh}$ in dependence upon the head, V denoting the discharge speed, g the acceleration of gravity and h the head.

Since the liquids which are to be distributed often contain suspended solid soil, or if the liquid contains, for example, a suspended catalyst, it has been found with the known liquid distributors that their exit orifices rapidly become clogged. Hence, these distributors cannot provide continuous satisfactory operation.

Liquid distributors may also introduce other disadvantages in use in certain environments. For example, German OS No. 1 519 711 discloses an inlet and distributor apparatus for a liquid-vapor mixture which is so constructed that a mixture entering a column, such as a distillation column, at high speed is retarded and separated into its vapor and liquid components.

Accordingly, it is an object of the invention to provide a liquid distributor which can operate satisfactorily even if a liquid contains suspended solids, is of reduced overall height and has a large free cross-section.

It is another object of the invention to be able to uniformly distribute a liquid over a given cross-section.

It is another object of the invention to avoid clogging of exit orifices of a liquid distributor during use.

It is another object of the invention to maintain the velocity of a liquid constant throughout the length of a liquid distributor.

Briefly, the invention provides a method of distributing a solids-containing liquid uniformly over a cross sectional area of a distribution channel. The method includes the steps of directing a flow of the liquid into an elongated distribution channel, sub-dividing the flow into discrete parallel components along the length of the distribution channel and expelling at least one component of flow from the distribution channel sequentially along the length of the channel while maintaining the remaining flow in the distribution channel at a constant velocity.

The invention also provides a liquid distributor which is comprised of at least one elongated distribution channel having one end for receiving a flow of a solids-containing liquid and a plurality of longitudinally disposed parallel walls which define a stepped configuration with an exit orifice between each two longitudinally consecutive walls for expelling a sub-divided component of flow.

The liquid distributor may include a plurality of such channels along with a common feed chamber for supplying liquid to the respective channels. In this respect, a single distribution channel may be provided where the distributor has a relatively small distribution area. However, a plurality of channels will usually be necessary to ensure that the entire area is supplied with a liquid uniformly.

Since the velocity of the liquid is maintained over the entire distribution cross-section, i.e. over the whole length of the distribution cross-sections, no particles of solid matter can be deposited in the distributor to reduce the channel cross section or, more particularly, to clog the exit orifices.

The liquid distributor can be particularly useful in mass transfer columns, particularly, absorption and reaction columns.

These and other objects and advantages of the invention will become more apparent from the following detailed description taken in conjunction with the accompanying drawings wherein:

FIG. 6b illustrates a partial cross sectional view of the distributor and tower of FIG. 6a.

Figure 1:
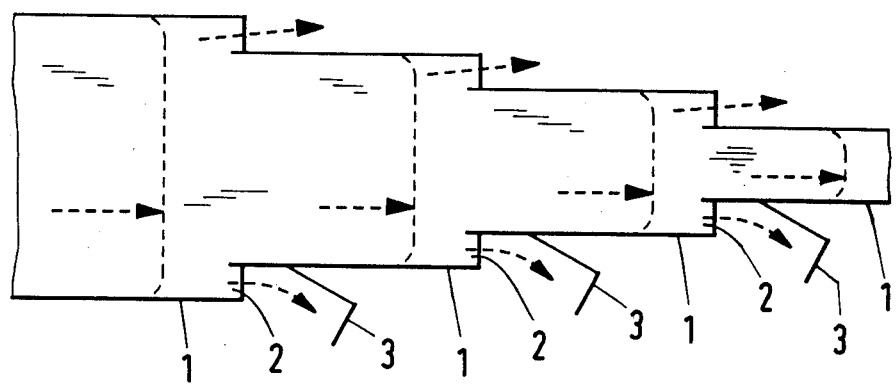
FIG. 1 illustrates a plan view of a part of a distribution channel constructed in accordance with the invention.
Figure 2:
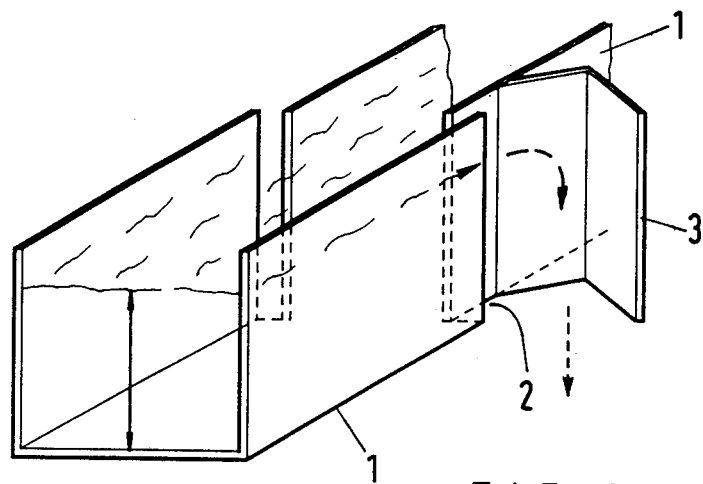
FIG. 2 illustrates a part perspective view of the channel of FIG. 1.

Referring to FIGS. 1 and 2, the liquid distributor is constructed as an elongated distribution channel for receiving a flow of a solids-containing liquid at one end. As indicated, the channel has a plurality of longitudinally disposed parallel walls 1 which sub-divide the distribution channel along the length of the channel so that the flow cross-section of the channel decreases in a stepped manner. In addition, an exit orifice 2 is disposed between each two longitudinally consecutive walls 1 for expelling a sub-divided component of flow.

The stepped configuration of the walls 1 and the arrangement of the exit orifices 2 perpendicular to the direction of flow ensures that the flow profile, as indicated in dotted lines in FIG. 1, and therefore the velocity of flow are maintained. Consequently, equal quantites of liquid issue from the exit orifices 2.

As indicated in FIG. 2, each exit orifice 2 is of slot-like shape and operates as a metering or dispensing means. The quantities of liquid are, so to speak, "peeled off" along the distribution channel 1.

The distribution channel may also be disposed at an inclination to a horizontal plane, for example, at an angle of from 5° to 10°. Further, as indicated in FIG. 1, the walls 1 are disposed in pairs longitudinally of the channel so that the exit orifices are symmetrically disposed longitudinally of the channel. Alternatively, the exit orficies may be disposed in staggered relation to each other longitudinally of the channel.

As indicated in FIG. 2, the distribution channel may have a rectangular cross-section.

Referring to FIGS. 1 and 2, means are provided on the exterior of the distribution channel downstream of the exit orifices 2 for deflecting the sub-divided components of flow away from the channel. As indicated, this means is in the form of angled plates 3 (shown only on one side). Each plate 3 is secured to the exterior of a wall 1 and serves to deflect, the component flow of liquid vertically downwardly freely under gravity.

Figure 3:
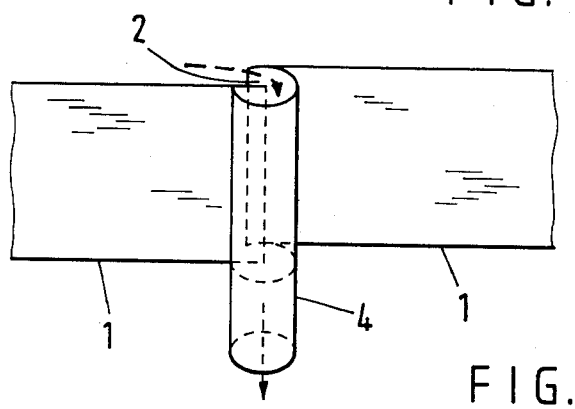
FIG. 3 illustrates a part of a liquid distributor constructed in accordance with the invention.

Referring to FIG. 3, the means for deflecting the component flows may be in the form of a partially cut-away tube deflector 4. In this case, the top part of the tube 4 functions as an impingement surface for the liquid while the bottom part functions as a discharge device for discharging the flow under gravity.

Figure 4:
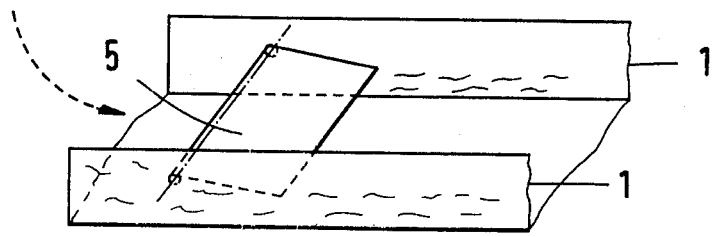
FIG. 4 illustrates a feed end of a distribution channel in accordance with the invention.

Referring to FIG. 4, in order to smooth the turbulence of the liquid supplied to a distribution channel, for example, by a feeder (not shown) at least one damper plate 5 is disposed in the channel near the feed end. In order to enable the quantity of liquid to be varied, the damper plate 5 may be in the form of a movable flap with a matched weight. As shown, the plate 5 is pivotally mounted about a transverse axis and is spaced above the base of the distribution channel with most of the flow passing under the plate 5.

Another means for stilling the feed flow is to provide a plurality of longitudinally spaced sills on the base of the channel.

Figure 5A:
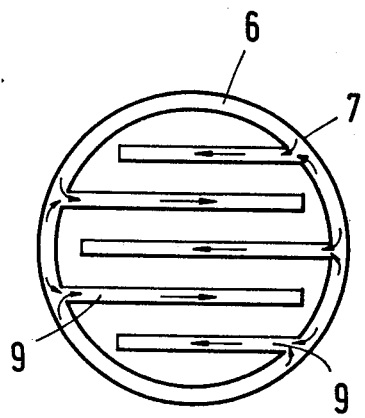
FIG. 5a illustrates a plan view of a modified liquid distributor having a plurality of distribution channels in accordance with the invention.
Figure 5B:
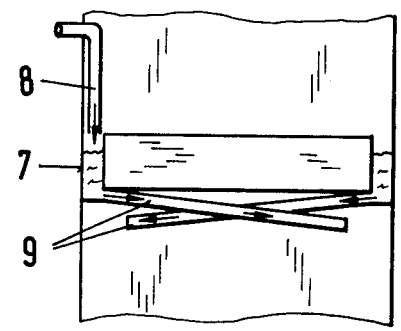
FIG. 5b illustrates a side view of the liquid distributor of FIG. 5a in a tower.

Referring to FIGS. 5a and 5b, a liquid distributor may be constructed with a plurality of distribution channels in order to distribute a liquid uniformly over a relatively large cross-sectional area. In this respect, the liquid distributor is disposed within a column 7 and includes an annular feed chamber 6 and a plurality of distribution channels 9 which extend in parallel relation to each other. As shown in FIG. 5b, a feed pipe 8 is provided within the column 7 in order to supply liquid to the annular feed chamber 6. In turn, each distribution channel 9 communicates at one end with the feed chamber 6 in an alternating manner, as indicated in FIG. 5a, so as to receive a liquid flow. In addition, each distribution channel is inclined downwardly, for example on an angle of from 5° to 10°.

Figure 6A:
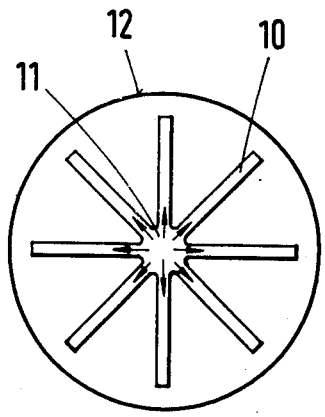
FIG. 6a illustrates a plan view of a modified liquid distributor within a tower.
Figure 6B:
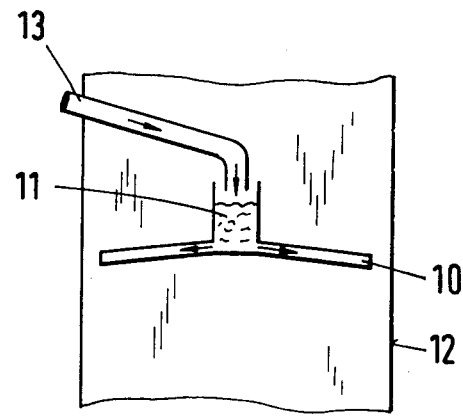

Referring to FIGS. 6a and 6b, a mass transfer column 12 may be provided with a distributor which has a central feed chamber 11 and a plurality of distribution channels 10 which extend radially from the feed chamber 11 to receive a flow of liquid therefrom. In this case, a feed pipe 13 is disposed within the column 12 to feed liquid into the central feed chamber 11 while each of the distribution channels extends on an incline radially outwardly from the central feed chamber 11.

During use, a flow of solids-containing liquid is directed into a distribution channel at one end and, during subsequent flow, is sub-divided into discrete parallel components along the length of the channel as indicated in FIG. 1. Each component of flow is then expelled under gravity from an exit orifice 2 while the remaining flow in the distribution channel is maintained at a constant velocity.

As is known the velocity of the liquid flow is proportional to the quantity of flow and inversely proportional to the cross-sectional area of flow. Thus, by reducing the quantity of flow for a given transverse cross section while also reducing the cross-sectional area of flow in the same proportion, the velocity of flow can be maintained constant throughout the length of a distribution channel. To this end, the positioning of the walls parallel to the flow direction and in the flow serves to "peel off" the component flows without disturbing the proportional relationship between the quantity of flow and cross sectional area.

The invention thus provides a liquid distributor which is useful not only for mass transfer columns but also for open systems such as systems for industrial sewage purification, wet metallurgy systems and systems for the preparation of minerals such as alumina or the like.

The invention further provides a liquid distributor which maintains the velocity of flow constant throughout the length of the distributor so that particles of solid matter do not readily deposit within the channel. As a result, the risk of clogging the exit orifices of the channel is reduced to a minimum.

I claim:

1. A method of distributing a solids-containing liquid uniformly over a cross-sectional area of a distribution channel, said method comprising the steps of directing a flow of solids-containing liquid into an elongated horizontally disposed distribution channel;

sub-dividing the flow into discrete vertical parallel components along the length of the distribution channel;

expelling at least one sub-divided component of flow under gravity from the distribution channel sequentially along the length of the distribution channel in parallel to the flow while maintaining the remaining flow in the distribution channel at a constant velocity; and deflecting each component of flow outside the channel vertically downwardly under gravity.

2. A liquid distributor comprising at least one elongated distribution channel having one end for receiving a flow of a solids-containing liquid and a plurality of longitudinally disposed parallel vertical walls defining a stepped configuration with a vertically disposed exit orifice perpendicular to the direction of flow between each two consecutive walls for expelling a sub-divided component of flow.

3. A liquid distributor as set forth in claim 2 wherein said channel is disposed at an inclination to a horizontal plane.

4. A liquid distributor as set forth in claim 3 wherein said inclination is at an angle of from 5° to 10°.

5. A liquid distributor as set forth in claim 4 wherein said parallel walls are disposed in pairs longitudinally of said channel.

6. A liquid distributor as set forth in claim 2 wherein said channel has a rectangular cross-section.

7. A liquid distributor as set forth in claim 2 wherein each exit orifice is of slot-like shape.

8. A liquid distributor as set forth in claim 2 wherein said exit orifices are symmetrically disposed longitudinally of said channel.

9. A liquid distributor as set forth in claim 2 which further comprises a vertically disposed deflector on an exterior of a wall downstream of a respective exit orifice to deflect a sub-divided component of flow from said channel downwardly under gravity.

10. A liquid distributor as set forth in claim 9 wherein each deflector is an angled plate.

11. A liquid distributor as set forth in claim 9 wherein each deflector is a partially cut-away tube.

12. A liquid distributor as set forth in claim 2 which further comprises at least one damper plate in said channel near said one end for smoothing the turbulence of a liquid supplied to said channel.

13. A liquid distributor as set forth in claim 2 having an annular feed chamber and a plurality of said channels extending in parallel with each channel having said end thereof communicating with said feed chamber in alternating manner.

14. A liquid distributor as set forth in claim 2 having a central feed chamber and a plurality of said channels extending radially from said feed chamber to receive a flow of liquid therefrom.

15. A liquid distributor having at least one distribution channel for receiving a flow of a solids-containing liquid at one end thereof, said channel having a plurality of longitudinally disposed parallel vertical side walls defining a decreasing stepped configuration longitudinally of said channel, each said pair of longitudinally consecutive walls defining a vertically disposed exit orifice perpendicular to the flow for freely expelling a component of flow parallel to the remainder of flow in said channel whereby the remainder of flow in said channel maintains a constant velocity throughout the length of said channel.

16. A liquid distributor as set forth in claim 15 including a plurality of said distribution channels and a feed chamber connected in common to said channels to supply liquid thereto.

17. A liquid distributor as set forth in claim 16 wherein each distribution channel includes a plurality of deflectors, each said deflector being vertically disposed downstream of an exit orifice to deflect a component of flow from said channel downwardly under gravity.

18. In combination, a mass transfer column; and a liquid distributor for distributing a solids-containing liquid within said column, said distributor including at least one distribution channel for receiving a flow of a solids-containing liquid at one end thereof, said channel having a plurality of longitudinally disposed parallel vertical side walls defining a stepped configuration longitudinally of said channel, each said pair of longitudinally consecutive walls defines a vertically disposed exit orifice perpendicular to the flow for freely expelling a component of flow parallel to the remainder of flow in said channel under gravity whereby the remainder of flow in said channel maintains a constant velocity throughout the length of said channel.

* * * * *